United States Patent [19]

Quadir

[11] Patent Number: 5,368,795
[45] Date of Patent: Nov. 29, 1994

[54] USE OF ETHYLENE/VINYL ACETATE POLYMER BINDERS AS DRYING PRESSING AIDS FOR CERAMIC POWDERS

[75] Inventor: Tariq Quadir, Columbia, Md.

[73] Assignee: Ferro Corporation, Cleveland, Ohio

[21] Appl. No.: 130,226

[22] Filed: Oct. 1, 1993

[51] Int. Cl.$^5$ .............................................. C04B 35/64
[52] U.S. Cl. ......................................................... 264/63
[58] Field of Search ................................. 264/63, 125

[56] References Cited

U.S. PATENT DOCUMENTS

| | | | |
|---|---|---|---|
| 4,530,808 | 7/1985 | Renlund et al. ........................ | 264/63 |
| 4,551,496 | 11/1985 | Renlund et al. ................. | 524/563 X |
| 4,711,916 | 12/1987 | Hagiwara et al. ............... | 524/430 X |
| 4,882,110 | 11/1989 | Kramer et al. .................. | 524/430 X |
| 5,034,451 | 7/1991 | Tanaka et al. ................... | 524/430 X |
| 5,043,118 | 8/1991 | Kim et al. ........................ | 524/430 X |
| 5,086,093 | 2/1992 | Miller ..................................... | 524/28 |
| 5,155,158 | 10/1992 | Kim ..................................... | 524/430 X |

*Primary Examiner*—Judy M. Reddick
*Attorney, Agent, or Firm*—Rankin, Hudak & Hill

[57] ABSTRACT

Aqueous ceramic slurries suitable for use in the forming of sintered ceramic bodies are formed by combining a) ceramic particles, b) an aqueous polymer emulsion containing an ethylene/vinyl acetate polymer, and c) water. The slurry is dried to form a free flowing powder which is then dry pressed to form a shape. The shape is then fired to remove the polymer and to sinter the ceramic particles thereby forming the sintered ceramic body. These binder systems do not require the use of organic solvents. The binder systems provide improved formability and green strength.

11 Claims, No Drawings

USE OF ETHYLENE/VINYL ACETATE POLYMER BINDERS AS DRYING PRESSING AIDS FOR CERAMIC POWDERS

BACKGROUND OF THE INVENTION

The methods known for making dense ceramic parts involve shaping a body of ceramic particles and firing the body to sinter the particles. While various methods such as extrusion, injection molding, etc. have been developed in recent years, "dry pressing" still remains as a widely used method of molding green ceramic parts. Processes falling in the category of dry pressing include cold pressing and isostatic pressing. These processes are characterized by the molding of a free flowing ceramic powder/binder mixture.

Dry pressing is advantageous in that it uses a low amount of binder compared to many of the other molding processes. Nevertheless, processes used in the past have often involved the use of organic solvents in the course of mixing the ceramic particles and the binder. Further, the low level of binder leads to various concerns regarding performance in the dry pressing process.

In dry pressing, there is a concern regarding the formability of the powder into a desired shape. A powder system having good formability makes it easier to mold the desired part without need for extremely high pressing pressures. High molding pressure is generally undesirable since it can lead to stress concentration and crack formation in the green body and fired part. The molded part should also have sufficient green strength and good die release characteristics (i.e. no sticking) so the pressed part can be removed from the die without breakage or creation of defects. Defects in the green ceramic body are usually retained in the sintered ceramic part.

Another source of defects in the dry pressing process can occur when the powder particle agglomerates retain rigidity during pressing. Efficient packing may not occur during the pressing in those circumstances. This poor packing can result in voids or relic structures during binder removal and sintering.

While there are many known binder systems used in dry pressing applications, most involve the use of organic solvents which present an environmental problem. Thus, there is a need for new binder systems to meet performance demands while eliminating the need to use organic solvents.

SUMMARY OF THE INVENTION

The invention provides improved binder systems for use in dry pressing as well as methods using those systems. These binder systems do not require the use of organic solvents. Yet, the binder systems of the invention provide performance comparable to or better than the performance of conventional binder systems in dry pressing processes.

In one aspect, the invention encompasses an aqueous ceramic slurry suitable for use in the forming of sintered ceramic bodies, the slurry comprising:
  a) ceramic particles,
  b) an aqueous polymer emulsion containing an ethylene/vinyl acetate polymer, and
  c) water.

The ethylene/vinyl acetate polymer is a preferably a copolymer or terpolymer. More preferably, the ethylene/vinyl acetate polymer is selected from the group consisting of ethylene/vinyl acetate/acrylate terpolymer and vinyl acetate/ethylene copolymer. The slurry may contain other additives such as dispersants, plasticizers, sintering aids, etc.

The invention also encompasses a method of forming a sintered ceramic body, the method comprising:
  a) combining ceramic particles, an aqueous polymer emulsion containing an ethylene/vinyl acetate polymer, and water to form a slurry,
  b) drying the slurry to form a free flowing powder,
  c) dry pressing the powder to form a shape, and
  d) firing the shape to remove the polymer and to sinter the ceramic particles thereby forming the sintered ceramic body.

The invention may be practiced with any known sinterable ceramic material or mixture of ceramic materials. These and other aspects of the invention will be described in more detail below.

DETAILED DESCRIPTION OF THE INVENTION

The invention involves the use of ethylene/vinyl acetate polymer-based aqueous emulsions in aqueous slurries of ceramic particles. The slurry would then be dried to form a substantially free flowing powder which is then dry pressed and fired to form a dense ceramic part.

Broadly, the aqueous ceramic slurry of the invention comprises:
  a) ceramic particles,
  b) an aqueous polymer emulsion containing an ethylene/vinyl acetate polymer, and
  c) water.

The slurry may also contain other components such as dispersants, plasticizers, pH adjusting agents, sintering aids, and defoaming (or antifoaming) agents. Other known expedients may also be added.

The ceramic particles used may be any sinterable ceramic material or mixture of materials. Preferred materials are those typically used in the preparation of structural ceramic parts. For example, the ceramic particles comprise a ceramic material selected from the group consisting of alumina, zirconia, silicon nitride, and mixtures thereof. The size of the ceramic particles may be any size conventionally used to form sintered ceramic bodies. While any workable loading of ceramic particles can be used in the slurry, preferably the slurry contains about 40–80 wt. % ceramic particles.

The term "ethylene/vinyl acetate polymer" is meant to indicate a polymer containing both ethylene and vinyl acetate components. The ethylene/vinyl acetate polymer in aqueous polymer emulsion b) is a preferably a copolymer or terpolymer. More preferably, the ethylene/vinyl acetate polymer is selected from the group consisting of ethylene/vinyl acetate/acrylate terpolymer and vinyl acetate/ethylene copolymer. The terpolymer is preferably one sold by Air Products Co. as Flexbond ® 153 which is an aqueous emulsion. The copolymer is preferably one sold by Air Products Co. as Airflex ® 426 which is also an aqueous emulsion. The ethylene/vinyl acetate polymer emulsion preferably contains about 45–65 wt. % solids. The emulsion is preferably present in an amount such that the amount of ethylene/vinyl acetate polymer in the slurry is about 1.0–10 wt. % based on the weight of the ceramic particles.

The amount of water present in the slurry may be any amount suitable to provide good mixing of the polymer and the ceramic particles. If desired, a dispersant may be added to the slurry to facilitate dispersion of the ceramic particles. A preferred dispersant is an ammonium polyacrylate sold by R. T. Vanderbilt Co. as Darvan® 821A. The amount of dispersant added (if any) is preferably about 0.5–5 wt. % based on the weight of said ceramic particles. Additionally, a pH adjusting agent such as ammonium hydroxide may be added to the slurry to further facilitate the dispersion of the ceramic particles. Generally, a slightly basic pH (8–10) is preferred with a pH of about 9 being most preferred. The optimal pH for dispersion may vary depending on the composition of the ceramic particles as well as the dispersant used.

While the ethylene/vinyl acetate polymer binders of the invention generally provide good burnout characteristics, in some cases, it may be desirable to add a plasticizer to the slurry to minimize any occurrence of relic structures during binder removal. Any suitable plasticizer may be used for this purpose. Preferred plasticizers are selected from the group consisting of wax emulsions and benzoate esters. Most preferred are Nopcote® 101 (wax emulsion with proprietary additive) sold by Henkel Corp., Dymsol® MS-40 (anionic or nonionic polyethylene wax emulsion), and Benzoflex® 9-38SG (dipropylene glycol dibenzoate) sold by Velsicol Chemical Corp. If added in excessive amounts, the plasticizer may adversely effect the formability of the ceramic-binder mixture (e.g. by causing die wall sticking). If used, the amount of plasticizer is preferably 5–50 parts by weight per part by weight of the ethylene/vinyl acetate polymer. Dipropylene glycol dibenzoate is a preferred plasticizer when ethylene/vinyl acetate copolymer is used.

When ethylene/vinyl acetate/acrylate terpolymer is used as the ethylene/vinyl acetate polymer and silicon nitride is the primary ceramic material to be sintered, it has been further found that the addition of polyvinyl alcohol (PVA) to the slurry improves the performance of the binder system. In such cases, preferably about 0.5–1.0 parts by weight PVA are added per part by weight of the terpolymer. PVA improves formability and green strength where high surface area ceramic particles are used.

Any known sintering aid for the ceramic particles may be added to the slurry. Other additives such as defoaming (or antifoaming) agents may also be added to the slurry.

According to the preferred method of the invention, the sintered ceramic body is formed by
 a) combining ceramic particles, an aqueous polymer emulsion containing an ethylene/vinyl acetate polymer, and water to form a slurry,
 b) drying the slurry to form a free flowing powder,
 c) dry pressing the powder to form a shape, and
 d) firing the shape to remove the polymer and to sinter the ceramic particles thereby forming the sintered ceramic body.

While any order of addition can be used in forming the slurry, preferably the ceramic particles are first combined with water and a dispersant (if used). Any pH adjusting agent is also preferably added initially. This initial mixture is then preferably mixed using any suitable technique (e.g. wet milling). The polymer emulsion is preferably added to the mixture near the end of the mixing step. The plasticizer, if used, is also preferably added with the polymer emulsion.

After all the ingredients have been combined, the resulting slurry is then dried to form a substantially free flowing powder. Any appropriate drying method may be used. A preferred drying method is spray drying. The spray drying is preferably carried out at about 100°–250° C. The dried powder preferably has a moisture content of about 0–0.5 wt. %. The resulting dried powder is then molded using any conventional cold pressing or isostatic pressing technique. Typically, the powder is poured into a die of the desired shape and pressure is then applied to form the shape to be fired. Preferably, the application of heat during the molding step is avoided since elevated temperatures may cause the molded shape to stick to the die wall.

Once the pressing has taken place, the shape is removed from the die. The shape is then fired to remove the ethylene/vinyl acetate polymer binder and sinter the ceramic particles. The firing conditions selected may be any conditions conventionally used for sintering the ceramic material contained in the shape.

These and other aspects of the invention are further illustrated in the examples below. The invention is not limited to the details or materials recited in the examples.

EXAMPLE 1

1000 g alumina powder (1.0 μm average particle size) was blended with 450 g deionized water and 10 g dispersant (Darvan 821A) to form a slurry. The slurry was then milled in a ball mill for about two hours. One half hour before the end of the milling, 10 g Flexbond® 153 polymer emulsion, 1 g defoaming agent and 35 g Nopcote® 101 wax emulsion were added to the slurry. The resulting milled slurry was then spray dried at an inlet spray drying temperature of about 200° C. to form a powder. The spray dried powder was then cold pressed and fired in air for about two hours at 1600° C. to produce a dense ceramic part.

EXAMPLE 2

1000 g alumina powder (1.0 μm average particle size) was blended with 450 g deionized water and 10 g dispersant (Darvan® 821A) to form a slurry. The slurry was then milled in a ball mill for about two hours. One half hour before the end of the milling, 50 g Flexbond® 153 polymer emulsion were added to the slurry. The resulting milled slurry was then spray dried at an inlet spray drying temperature of about 200° C. to form a powder. The spray dried powder was then cold pressed and fired in air for about two hours at 1600° C. to produce a dense ceramic part.

EXAMPLE 3

100 g tetragonal zirconia powder (0.8 μm average particle size) was blended with 66.66 g deionized water, 0.3 g NH₄OH and 1 g dispersant (Darvan® 821A) to form a slurry. The slurry was then milled in a ball mill for about two hours. One half hour before the end of the milling, 1.5 g Flexbond® 153 polymer emulsion and 3.5 g Nopcote® 101 wax emulsion were added to the slurry. The resulting milled slurry was then spray dried at an inlet spray drying temperature of about 200° C. to form a powder. The spray dried powder was then cold pressed and fired in air for about two hours at 1500° C. to produce a dense ceramic part.

EXAMPLE 4

100 g silicon nitride powder (0.4 μm average particle size) was blended with 66 g deionized water and 1 g dispersant (Darvan® 821A) to form a slurry. The slurry was then milled in a ball mill for about two hours. One half hour before the end of the milling, 4 g Flexbond® 153 polymer emulsion and 10 g of a 10 wt. % solids PVA emulsion were added to the slurry. The resulting milled slurry was then spray dried at an inlet spray drying temperature of about 200° C. to form a powder. The spray dried powder was then cold pressed and fired in air for about two hours at 1800° C. to produce a dense ceramic part.

What is claimed is:

1. A method of forming a sintered ceramic body, said method comprising:
    a) combining ceramic particles, an aqueous polymer emulsion containing an ethylene/vinyl acetate polymer, and water to form a slurry,
    b) drying said slurry to form a free flowing powder,
    c) dry pressing said powder to form a shape, and
    d) firing said shape to remove said polymer and to sinter said ceramic particles thereby forming said sintered ceramic body.
2. The method of claim 1 wherein said ethylene/vinyl acetate polymer is a copolymer or terpolymer.
3. The method of claim 2 wherein said ethylene/vinyl acetate polymer is selected from the group consisting of ethylene/vinyl acetate/acrylate terpolymer and ethylene/vinyl acetate copolymer.
4. The method of claim 1 wherein said aqueous polymer emulsion contains 45–65 wt. % solids.
5. The method of claim 1 wherein a dispersant is added to said slurry in step a) to facilitate dispersion of said ceramic particles.
6. The method of claim 1 wherein a plasticizer for said polymer is added to said slurry during step a).
7. The method of claim 6 wherein said plasticizer is selected from the group consisting of wax emulsions and benzoate esters.
8. The method of claim 1 wherein the slurry contains about 1.0–10 wt. % of said ethylene/vinyl acetate polymer based on the weight of said ceramic particles.
9. The method of claim 1 wherein the slurry contains about 40–80 wt. % of said ceramic particles.
10. The method of claim 1 wherein said ceramic particles comprise ceramic material selected from the group consisting of alumina, zirconia, silicon nitride, and mixtures thereof.
11. The method of claim 1 wherein a sintering aid for said ceramic particles is added to said slurry during step a).

* * * * *